United States Patent [19]
Belongia et al.

[11] Patent Number: 5,463,937
[45] Date of Patent: Nov. 7, 1995

[54] AUTOMATIC BREADMAKER WITH PLURAL KNEADING MEMBERS

[75] Inventors: David C. Belongia, West Bend; Annette T. Klein, Jackson, both of Wis.

[73] Assignee: The West Bend Company, West Bend, Wis.

[21] Appl. No.: 328,504

[22] Filed: Oct. 25, 1994

[51] Int. Cl.⁶ ........................................... A47J 27/00
[52] U.S. Cl. ........................ 99/348; 366/97; 366/297
[58] Field of Search ........................ 99/348, 331, 468; 366/300, 297, 314, 97, 98

[56] References Cited

U.S. PATENT DOCUMENTS

| | | |
|---|---|---|
| 2,415,711 | 5/1943 | Sticelber . |
| 3,342,425 | 9/1967 | Morton .................................. 366/314 |
| 4,243,605 | 11/1980 | Takeuchi . |
| 4,294,166 | 10/1981 | Takeuchi .................................. 366/97 |
| 4,911,557 | 3/1990 | Dormer et al. ........................ 366/297 |
| 4,984,512 | 1/1991 | Takahashi et al. . |

FOREIGN PATENT DOCUMENTS 2213698 8/1989 United Kingdom .

Primary Examiner—David Scherbel
Assistant Examiner—Reginald L. Alexander
Attorney, Agent, or Firm—Jansson & Shupe, Ltd.

[57] ABSTRACT

Disclosed is an automatic breadmaker having a pan which is longer than it is wide. Such pan has a pair of pivot-mounted collapsible kneading members spaced horizontally along the bottom of the pan. Each kneading member is coupled to a separate drive shaft extending up through the pan bottom and both shafts are powered by a motor and drive linkage. For easy attachment to and removal from its drive shaft for washing, each kneading member has a hub which forms a grip member. The new breadmaker facilitates automatic preparation of a loaf of normal configuration, having a curved or "crown-like" risen topside extending along its length.

22 Claims, 7 Drawing Sheets

AUTOMATIC BREADMAKER WITH PLURAL KNEADING MEMBERS

FIELD OF THE INVENTION

This invention is related generally to food apparatus and, more particularly, to breadmakers.

BACKGROUND OF THE INVENTION

Automatic breadmakers for home use are becoming increasingly popular, in part because the user is able to prepare specialty and custom loaves of bread of a type not available or not readily available at commercial outlets. Another reason for the popularity of such breadmakers is that bread can be consumed when warm, i.e., immediately at the conclusion of baking. Warm, freshly baked bread has a unique aroma and texture that adds to dining pleasure.

There are a number of examples of automatic breadmakers in the patent literature. U.S. Pat. Nos. 4,776,265 (Ojima); 4,836,683 (Aoyama); 4,870,896 (Asahina et al.) and 4,977,822 (Seo et al.) are but a few.

Despite the growing popularity of automatic breadmakers, their containers produce a loaf of bread which only modestly resembles the size, shape and appearance of a normal bakery loaf. For example, the breadmakers shown in the Asahina et al. and Seo et al. patents have upright rectangular "can-like" containers. Such breadmakers produce a loaf of bread which, in cross-section along a plane normal to the upright long axis of the loaf, is square or substantially so.

The breadmaker shown in U.S. Pat. No. 4,234,605 (Takeuchi) has a pair of such can-like containers connected to one another. But whether used singly or in pairs, the appearance of the loaf is as described above.

Further, the dimensional proportions of the loaf made using, e.g., the Asahina et al., Takeuchi and Seo et al. breadmakers are unusual. Such loaves are substantially cubic. A loaf made using the Ojima or Aoyama breadmaker is cylindrical and, therefore, even more unusual—and more difficult to slice or to toast in a conventional toaster which accommodates slices from a normal bakery loaf.

And when the bread rises in the prior art breadmaker containers noted above, the raised top part of the loaf resembles a bowl-like dome rather than the longer top side of a normal bakery loaf. Since a cubic loaf is often placed on one of its four flat sides for slicing, the slice which includes the dome end has a shape quite unlike the end slice of a normal bakery loaf which is substantially flat or only slightly curved. Some prefer not to serve such a dome-shaped slice, especially to guests.

The bread produced by these prior art breadmakers has an upwardly elongate, cubic or cylindrical appearance because the prior art devices rely on a single rotary vane (as shown in the Ojima patent) or similar structure to mix the bread components and knead the dough. Use of a single vane limits the length of the horizontal axis of the bread pan because the vane must span virtually the entire bottom surface of the bread pan to adequately mix the bread components and knead the dough. The result is a loaf of bread which has an unusual shape and does not resemble a bakery loaf.

Rotary vanes for kneading the dough mix have other disadvantages. When baking is complete, the vane "imprint" in the loaf end is a small cavity (or "navel" as it is sometimes called) with a hollow passage extending from such cavity. When the loaf is laid on a side for slicing, the cavity and passage are exposed to view. A normal bakery loaf is free of such cavity and passage.

Of even greater concern to users of known breadmakers is the fact that at least the first slice from that end of the loaf in contact with the vane has a keyhole-shaped opening through it. Quite aside from aesthetic considerations, a slice of bread with a substantial opening through it would be considered by most to be unsuitable for making sandwiches.

Known automatic breadmakers lack a horizontally-configured pan and are incapable of mixing and kneading the ingredients in such a pan. An improved breadmaker having such a pan, offering features permitting proper ingredient mixing in such a pan and producing a loaf of bread having a configuration like that of a normal bakery loaf would be an important advance in the art.

OBJECTS OF THE INVENTION

It is an object of this invention to provide an automatic breadmaker overcoming problems in the art, including those mentioned above.

Another object of this invention is to provide an automatic breadmaker capable of baking a loaf of bread having a configuration like that of a normal bakery loaf.

Another object of this invention is to provide an automatic breadmaker capable of baking a loaf of bread which is longer than it is wide.

Still another object of this invention is to provide an automatic breadmaker capable of baking a loaf of bread which is free of a bowl-like dome on its end.

Another object of this invention is to provide an automatic breadmaker capable of baking a loaf of bread which is free of a small cavity in the loaf end.

Yet another object of this invention is to provide an automatic breadmaker capable of baking a loaf of bread providing slices that are free of a keyhole-shaped opening. How these and other objects are accomplished will become apparent from the following detailed description and from the drawing.

SUMMARY OF THE INVENTION

The invention involves an automatic breadmaker having a base and drive means including a motor secured to such base. A drive linkage extends from the motor and terminates at the chamber in a pair of drive members, each of which has a drive shaft linked to it. The new breadmaker also has an oven chamber and a pan in the chamber.

The pan is a horizontally-configured "wide-loaf" pan with a spaced pair of paddle-like kneading members in it. The kneading members are linked to and powered by the drive means for ingredient mixing and dough kneading. The new breadmaker facilitates automatic preparation of a loaf of normal configuration having a curved "crown-like" risen topside extending along its length and otherwise having an appearance closely resembling that of a commercially-baked loaf.

In another aspect of the invention, the pan has a bottom which is longer than it is wide and the pair of kneading members are spaced along the length of the pan and rotate simultaneously in a plane generally parallel to the pan bottom. The kneading members and pan are cooperatively sized so that dough in the pan will be reached by one or both of the kneading members.

In a specific embodiment, each kneading member has a grip member embodied as a hub which slips over and engages a drive shaft. The grip member facilitates easy attachment of a kneading member to its shaft and subsequent removal of such kneading member for washing following baking.

Preferably, each hub has a lower end and a blade pivotably secured along such lower end. The blade pivots between an upright kneading position and a collapsed non-kneading position along the pan bottom. Whether or not the blade is upright or collapsed is a function of the rotation direction in which the kneading member is driven. In an alternate embodiment, the pan bottom has recessed portions, each of which receives one of the kneading members. Such recessed portions are of sufficient depth to fully receive the collapsed blades.

In another aspect of the invention, the pan bottom has a spaced, parallel pair of drive shafts through it and a pair of drive members below the pan. Each kneading member is linked to a separate respective drive shaft and, in turn, each shaft is coupled to a respective driving member, both of which are driven by the motor.

Further details of the invention are set forth in the following detailed description and in the drawing.

DETAILED DESCRIPTIONS OF THE PREFERRED EMBODIMENTS

In this specification, the term "length" means a dimension measured generally left-right as viewed in FIGS. 1, 2, 3 and 4. The term "width" means a dimension measured generally front-rear as viewed in FIG. 1 or measured generally up-down as viewed in FIG. 3. The terms "height" or "depth" means a dimension measured generally up-down as in FIGS. 1, 2 and 4.

Figure 1:
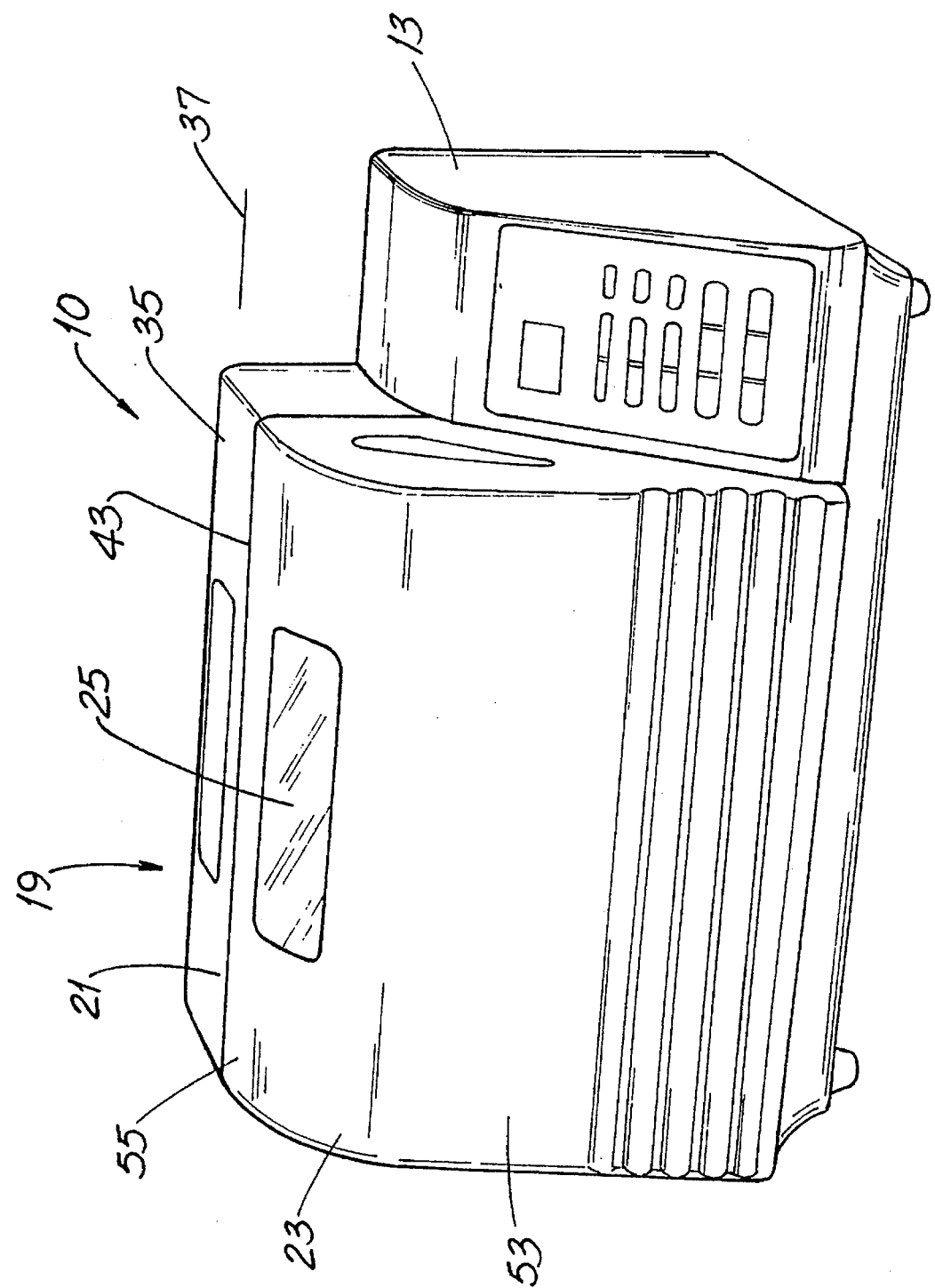
FIG. 1 is a perspective view of the new breadmaker.
Figure 2:
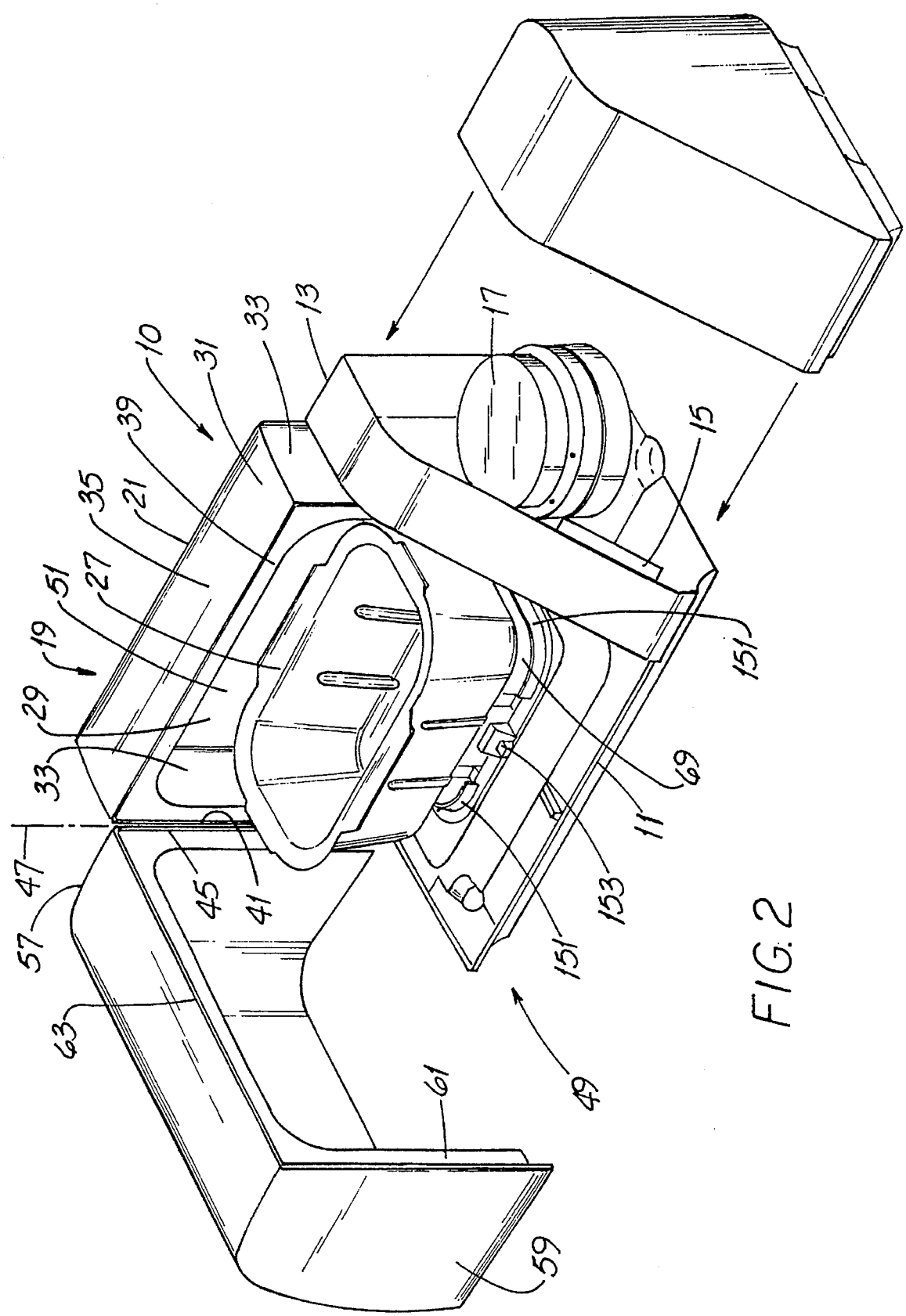
FIG. 2 is a perspective view of the breadmaker with the door open and the compartment cover removed.

Referring to FIGS. 1 and 2, the new automatic breadmaker 10 has a base or floor 11 and a compartment 13 atop the floor. Such compartment 13 encloses a controller 15 and a reversible electric motor 17. The controller 15 executes the operating cycle of the breadmaker 10 and as described in more detail below, the motor 17 powers kneading members which mix ingredients to make bread dough.

An oven chamber 19 is atop the floor 11, abuts the compartment 13 and is formed by the floor 11, a wall member 21 and an access door 23 having a window 25 allowing the user to view kneading and baking operations. A pan 27 for receiving ingredients mixed to make bread dough is mounted in the chamber 19.

The wall member 21 has a rear portion 29, a top portion 31 and lateral side portions 33, all of which are fixed, i.e., non-movable with respect to one another and to the floor 11. The surface 35 of the top portion 31 is at a first level 37 above the breadmaker floor 11 and the portions 31, 33 define a flat face which is substantially perpendicular.

The wall member 21 also has a vertical lateral edge 41 and a horizontal top edge 43, the latter located substantially directly above the pan 27 and extending along the pan length. In a highly preferred embodiment, the access door 23 is hinged to the wall member 21 along the front lateral edge 41 of the wall member 21 and along a rear lateral edge 45 of the door 23 and is pivotable laterally about a substantially vertical axis 47. Thus, the access door 23 swings in a substantially horizontal direction and creates a front opening 49 extending substantially to the floor 11, to the region above the pan and to the side portions 33.

The door 23 itself has a front surface 53 and a top surface 55, both of which are attractively curvilinear. There are also substantially flat first and second side surfaces 57, 59, respectively, the former having a substantially vertical rear edge 45. At least major portions of the top surface 55 and the first side surface 57 extend rearwardly from the front surface 53. The door 23 swings laterally for front opening without any door movement above the first level 37 and the resulting opening 49 extends substantially to the oven floor 11.

The portions 55, 57, 59 also define a flat face 61 which is substantially perpendicular and which abuts the face 39 of the wall member 21 when the door 23 is closed for baking. When the access door 23 is closed, it extends upwardly from along the oven floor 11 and curves rearwardly to a position directly above the pan 27. That is, the top edge 63 of the door 23 abuts the top edge 43 of the wall member 21 directly above the pan 27. When the door 23 is open, the breadmaker 10 has a very generous mouth area, open at the top as well as at the front and sides, so that insertion and removal of the pan 27 is further facilitated.

A laterally-swinging door 23 has advantages over a top-hinged door (a door hinged along its top edge), especially where a breadmaker occupies a place on a kitchen counter beneath cupboards, as is frequently the case. Such a door 23 swings substantially horizontally and permits multi-directional access to the oven chamber 19 with the door 23 away from the front of the breadmaker 10. Counter-to-cupboard spacing can prevent a top-hinged door from being fully opened and/or from staying open. The laterally-swinging door 23 also has advantages over a bottom-hinged door since when open, the latter protrudes outward toward the user and may impair easy access to the oven chamber.

Figure 3:
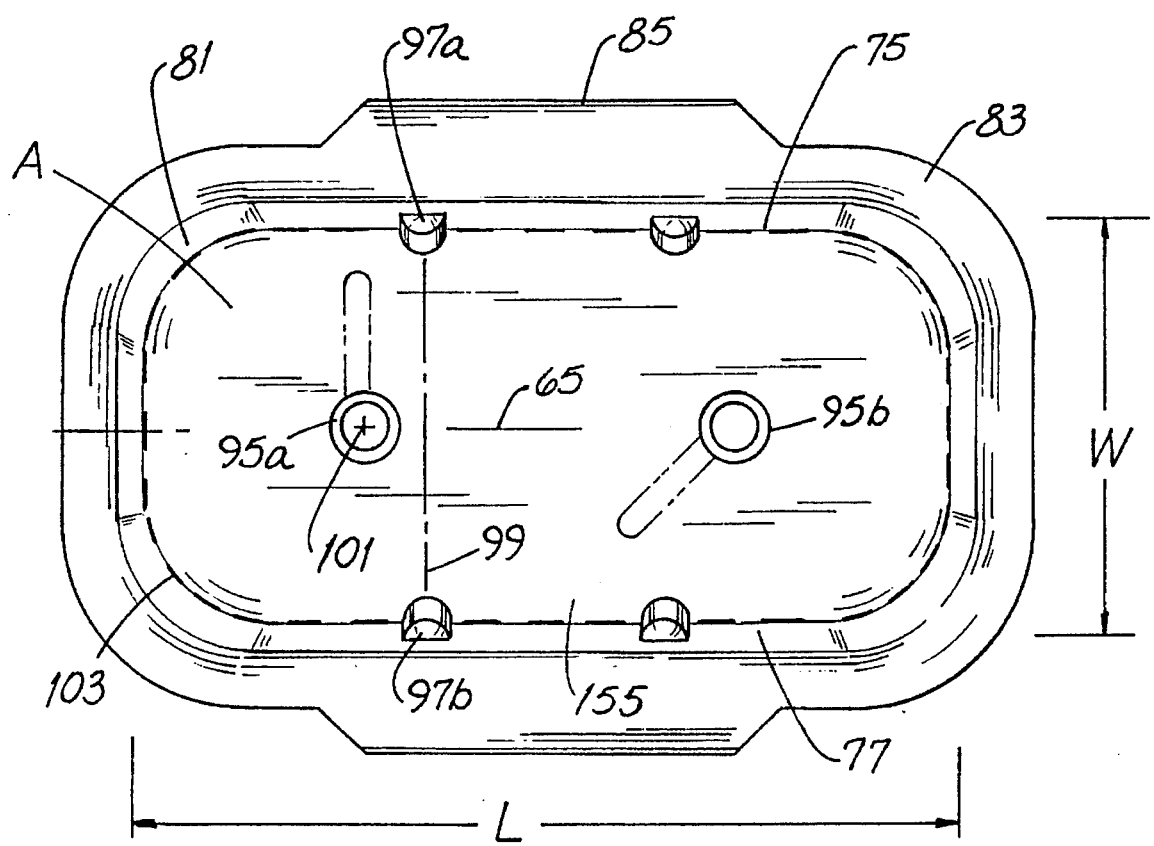
FIG. 3 is a top plan view of the new pan used with the breadmaker of FIGS. 1 and 2.

It is apparent from FIG. 2 that the oven floor 11 and the access door 23 are each longer than the pan 27. Such configuration accommodates "wide-side" insertion of the pan 27 into the chamber 19 and minimizes the height of the breadmaker 10. ("Wide-side" insertion means that the pan 27 can be inserted into the chamber 19 while holding the pan so that as shown in FIG. 3, its long axis 65 is generally parallel to the rear portion 29 of the wall member 21. There is no need to twist or turn the pan 27 during pan placement and removal.)

Referring now to FIGS. 1, 3, 4 and 5, features of the new breadmaker pan 27 will now be described. The new pan 27 has a bottom 67 supported atop a "foot-like" downwardly-extending rim 69. When the pan 27 is in place in the chamber 19, such rim 69 rests on the oven floor 11.

The pan 27 has first and second end panels 71 and 73, respectively, and first and second side panels 75 and 77, respectively. The panels 71, 73, 75 and 77 are substantially flat and extend upwardly from the bottom 67 at an angle thereto which is slightly greater than 90°. The pan 27 is thereby said to have "draft" so that the baked loaf can be easily removed therefrom by inverting the pan 27. The junctions 79 of the panels 71, 73, 75, 77 with the bottom 67 and the junctions 81 of the panels 71, 73, 75, 77 with one another are slightly curved and serve to give a shape to the finished loaf which closely resembles that of a normal bakery loaf made in a commercial bakery.

The top of the pan 27 is bounded by an outwardly-projecting lip 83 and a handle 85 juts from the lip 83 above each of the side panels 75 and 77. While the pan 27 may be grasped by the lip 83 anywhere around its perimeter, the handles 85 permit a more positive grasp which is of benefit when handling a hot pan 27 with insulated mitts, pads or the like.

The bottom 67 has a pair of bosses 87 spaced along the length of the pan 27. Each boss 87 has a shaft aperture 89 formed in it and a bearing 91 is mounted in each aperture 89 to receive a shaft 93 with slight sliding clearance. Such shafts 93 are linked to the motor 17, extend through the pan bottom 67 and drive the kneading members 95a, 95b.

The interior of the pan 27 includes a plurality of spaced-apart mixing ridges 97 extending generally between the bottom 67 and the lip 83. In a highly preferred embodiment, there are four ridges 97, i.e., a pair of ridges 97 for each kneading member 95. Each ridge 97 is linear in an up-down direction and has a generally semi-circular cross-sectional shape. Preferably, each opposed pair of ridges, e.g., ridges 97a and 97b as in FIG. 3, are on an axis 99 spaced slightly from the center axis 101 of the adjacent shaft 93. With kneading members 95 configured as described below, such members 95 will "clear" the ridges 97 when folded flat for baking at the conclusion of dough kneading.

It has been found that when the pan 27 is configured to produce a one- or one-and-one-half pound loaf of bread configured like a normal bakery loaf, the preferred number and placement of the ridges 97 is as described above. Such ridges 97 tend to keep the ball of bread dough centered in the pan 27 and such ball is less likely to undesirably "spin." And dough ingredients, e.g., flour, scour better from the curved pan junctions 81.

In another aspect of the invention, the pan 27 has a length L, a width W, an inside base area A (the area circumscribed by the overlay heavy dashed line 103) and a depth D. In a preferred embodiment, the ratio of length L to width W is greater than 1.5 and, most preferably, such ratio is greater than 1.8. Further, the ratio of depth D to inside bottom area A is preferably less than about 0.1 and, most preferably, is less than about 0.08. (It is noted that D and A are linear and area measurements, respectively. The ratios use numerical values without regard to units of measure.)

Figure 4:
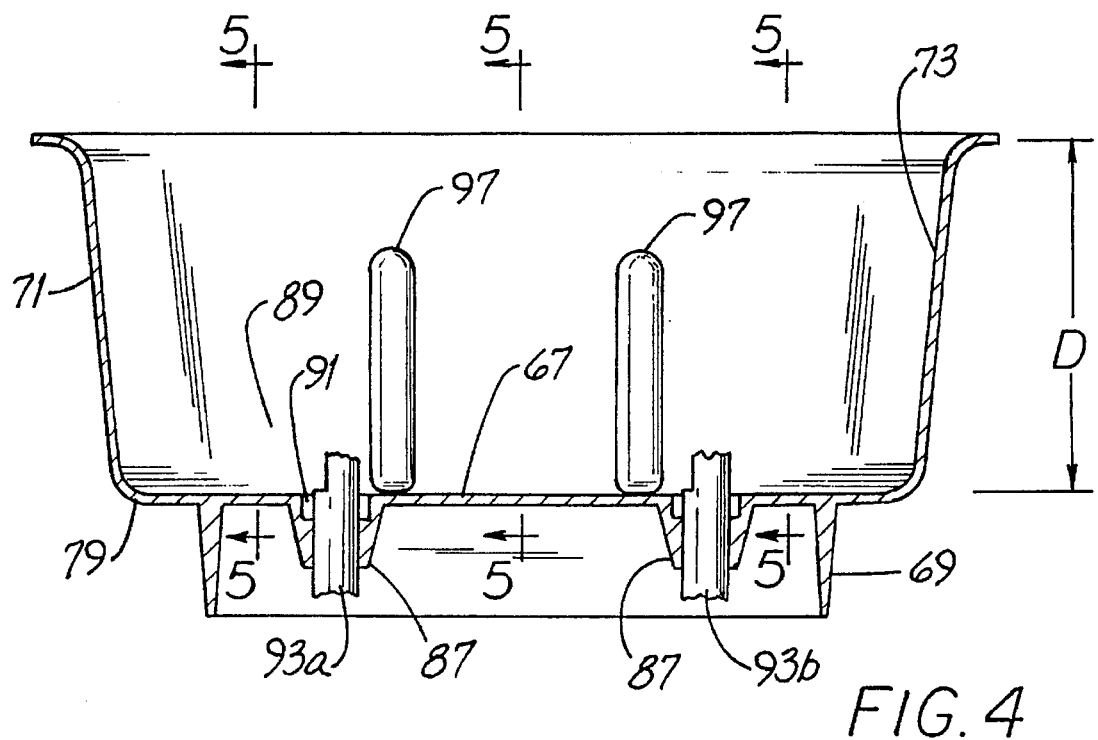
FIG. 4 is a cross-section side elevation view of the pan of FIG. 3.
Figure 5:
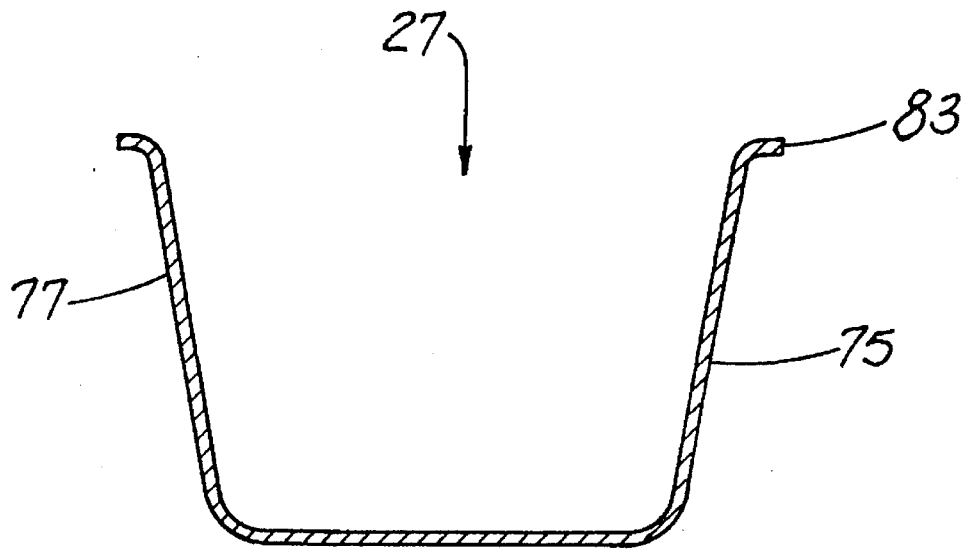
FIG. 5 is a cross-section view of the pan of FIG. 4 taken along any one of the viewing planes 5—5 thereof.

Referring particularly to FIGS. 4 and 5, another feature of the new pan 27 is that right cross-sectional configurations of the pan 27, i.e., the pan size and shape as viewed in cross-section at planes 5—5 at right angles to the long axis 65 of the pan 27 and at spaced locations along the pan length, are substantially constant. This feature also contributes to the fact that the loaf produced by the new breadmaker 10 has the appearance of a normal bakery loaf.

Figure 6:
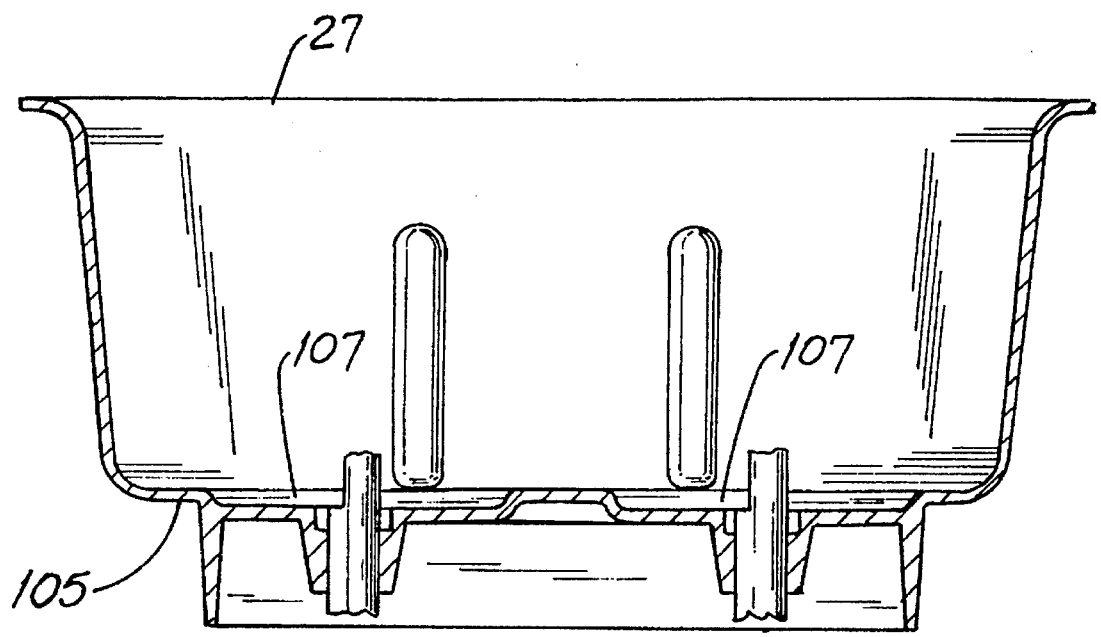
FIG. 6 is a cross-section side elevation view of a second embodiment of the pan of FIG. 3.
Figure 12:
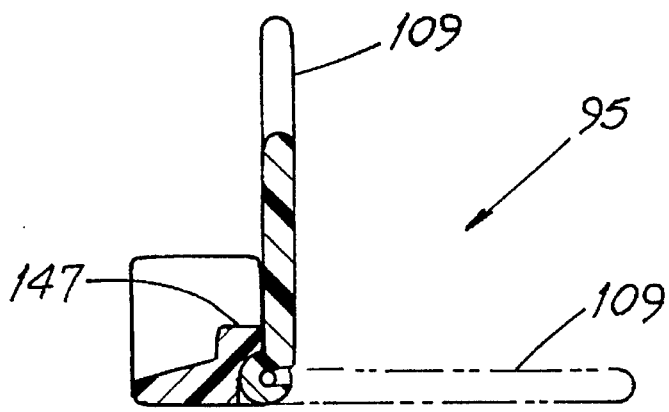
FIG. 12 is a section view of the kneading member taken generally along the plane 12—12 of FIG. 10.

Referring also to FIGS. 6 and 12, a second embodiment of the pan 27 includes a pan bottom 105 having a pair of recessed portions 107, each receiving one of the kneading members 95 described below. Preferably, each recessed portion 107 is of sufficient depth to fully receive the collapsed blade 109 of the kneading member 95. That is, when a blade 109 is folded flat as shown in dashed outline in FIG. 12, such blade 109 is "nested" in a recessed portion 107.

Figure 7:
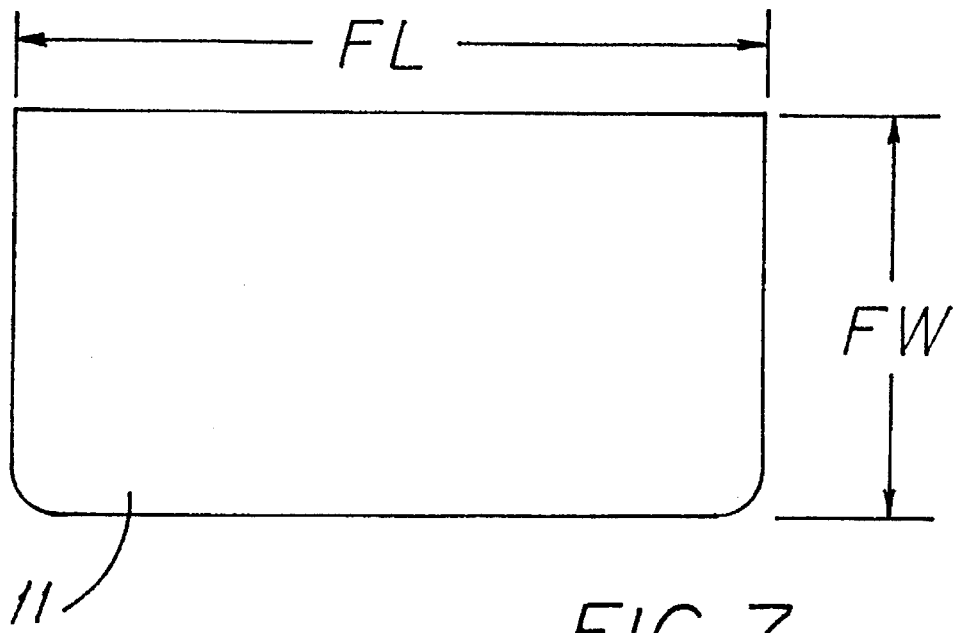
FIG. 7 is a representative top plan view of the floor of the new breadmaker.

Considering the oven floor 11 shown in FIGS. 1 and 7, such floor 11 has a floor length FL and a floor width FW. The preferred ratio of floor length FL to floor width FW is at least about 1.5 and most preferably, such ratio is at least about 1.8.

Figure 8:
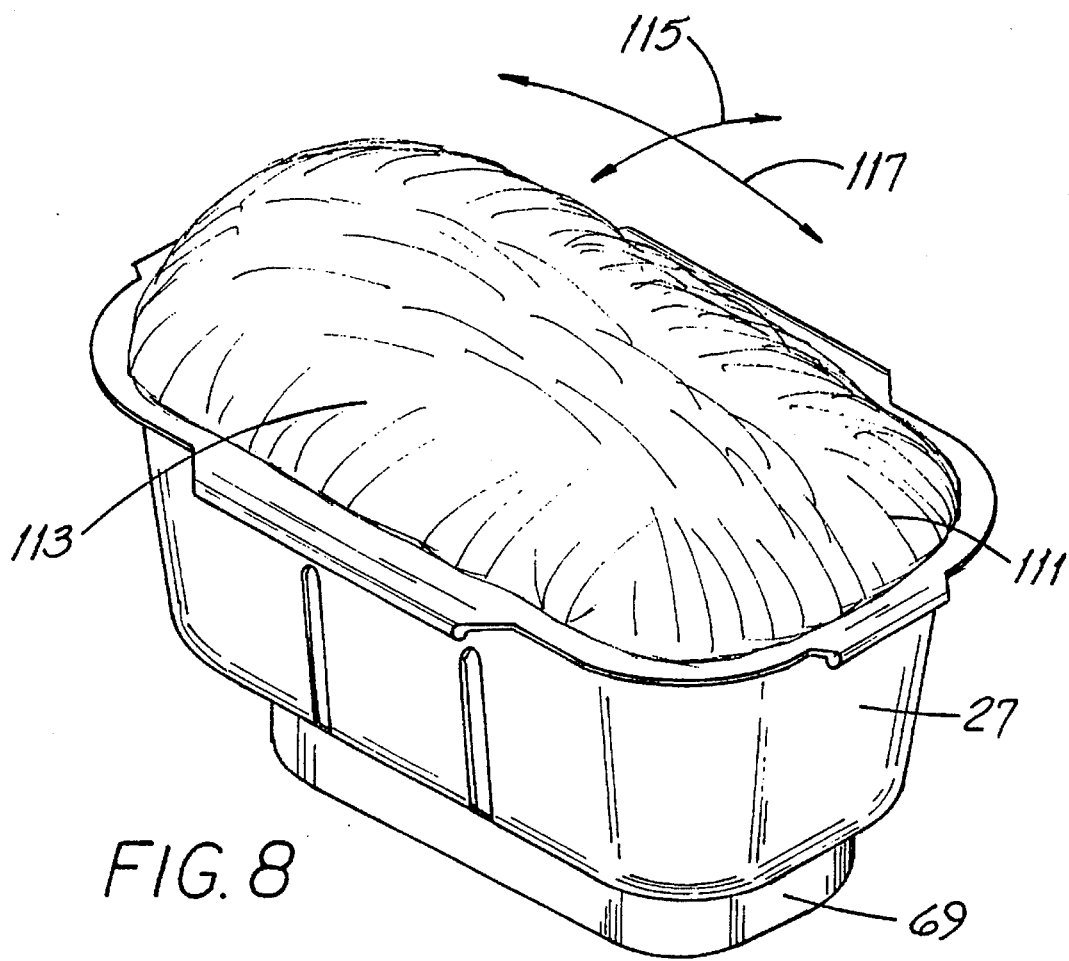
FIG. 8 is a perspective view of the pan of FIGS. 3, 4 and 5 shown in conjunction with a loaf of bread.
Figure 9:
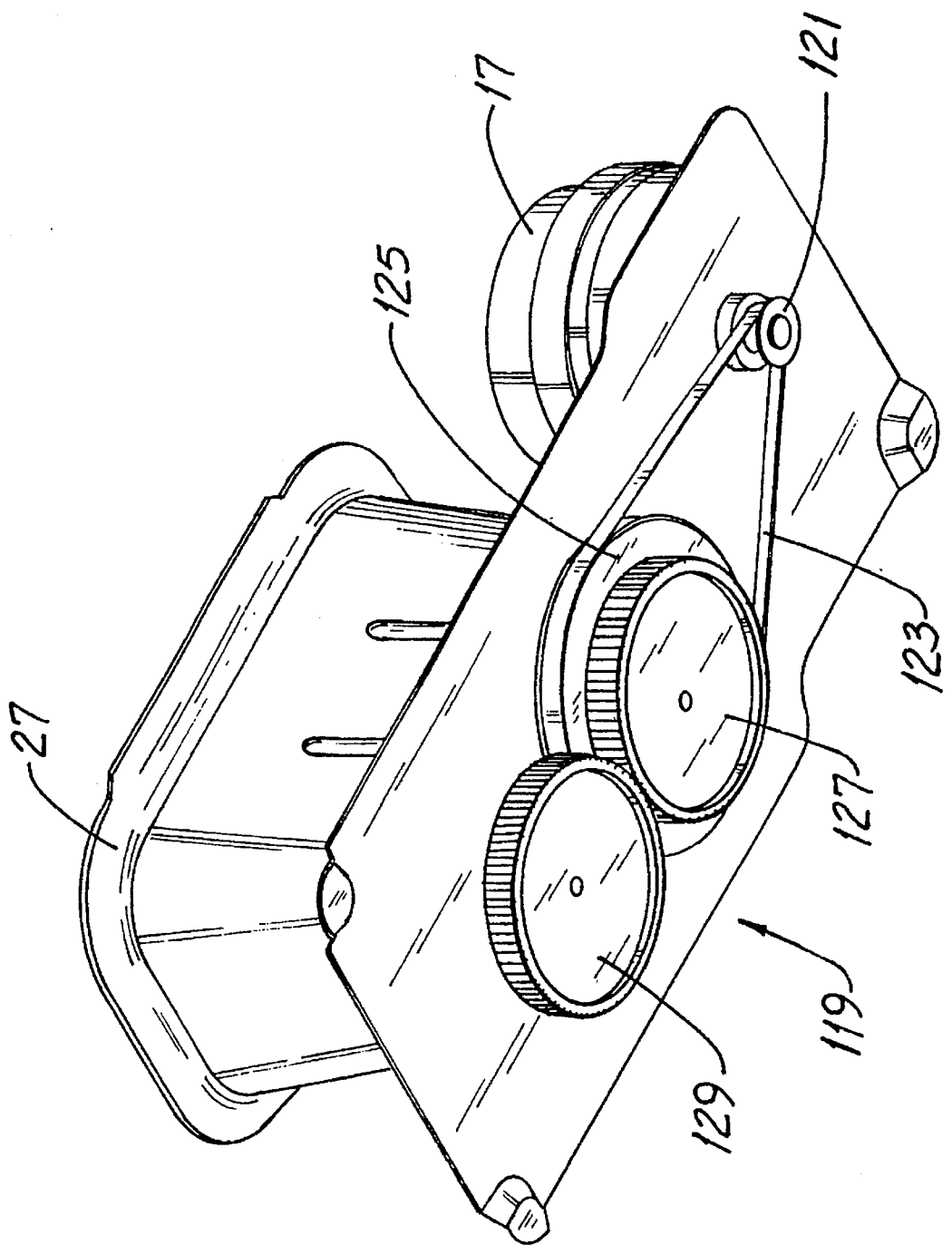
FIG. 9 is an underside perspective view of the arrangement for driving the kneading members of the breadmaker.
Figure 10:
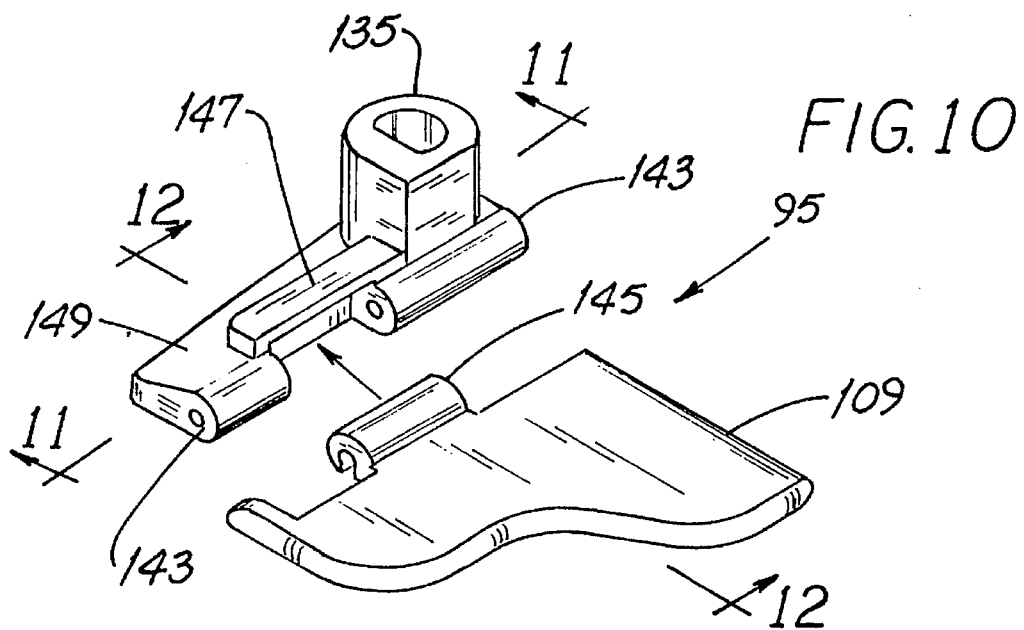
FIG. 10 is a perspective exploded view of a kneading member.
Figure 11:
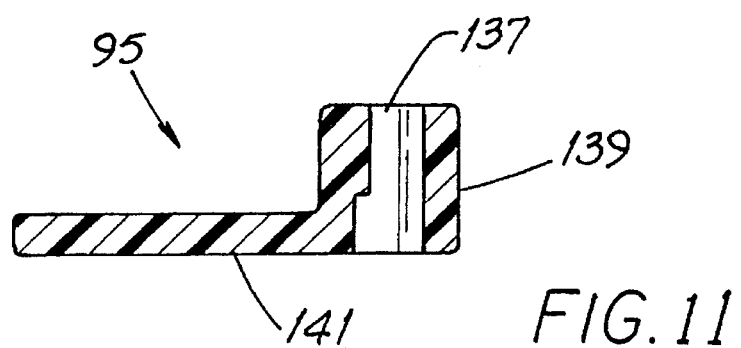
FIG. 11 is a section view of the kneading member taken generally along the plane 11—11 of FIG. 10.

From the foregoing and referring also to FIG. 8, it will be appreciated that the breadmaker 10 and its pan 27 produce a loaf of bread 111 in the configuration of a normal bakery loaf. That is, the loaf 111 has substantially flat ends and sides and a risen topside 113 extending along its length. As is characteristic of a normal bakery loaf, the loaf produced by the breadmaker is "crowned" or curved in two mutually-perpendicular planes as represented by the arrows 115 and 117.

Referring now to FIGS. 3, 4, 9, 10, 11 and 12 aspects of the kneading members 95 and how such members 95 are powered will now be described. The motor is coupled to means 119 for driving such members 95 and has a smaller-diameter driving pulley 121 attached to and rotating with the motor shaft. Such pulley 121 is linked by a belt 123 to a larger-diameter driven pulley 125 which rotates at a speed well below that of the pulley 121.

A first intermediate-diameter gear 127 is mounted on and concentric with the pulley 125 and, of course, rotates at the same speed as the pulley 125. The first gear 127 engages a second gear 129 which is also of intermediate diameter equal to that of the first gear 127. From the foregoing, it is apparent that for either direction of motor rotation, the gears 127, 129 rotate in opposite directions at the same speed.

The shaft 93a driving one of the kneading members 95a is concentric with the gear 129 and the shaft 93b driving the other kneading member 95b is concentric with the pulley 125 and gear 127. The shafts 93a, 93b are substantially parallel to one another and both shafts 93 rotate at the same speed which, of course, is much lower than the shaft speed of the motor 17.

Each kneading member 95 has a hub 135 with an opening 137 therethrough sized and shaped to fit its respective drive shaft 93 with slight sliding clearance. The opening 137 may be in the shape of the letter D or may have any other torque-transmitting shape, e.g., square or hexagon.

The hub 135 includes a grip member 139 to facilitate finger grasping and attachment of the kneading member 95 after the pan 27 is placed in the breadmaker 10 reparatory to ingredient mixing, dough kneading and baking. Each kneading member 95 includes a lower arm 141 extending radially outward from the hub 135 and having a kneading blade 109 pivotably pinned to it. Specifically, the arm 141 has a pair of radially-spaced tube-like portions 143 between which is received the portion 145 of the blade 109. The portions 143 and 145 are coupled together by a pin (not shown).

The arm 141 also has an abutment member 147 supporting the blade 109 at its upright position. Depending upon the direction in which a kneading member 95 is being driven, its blade 109 stands upright for mixing or kneading (and is supported there by the abutment member 147) or collapses by folding down for baking. (From the foregoing, it is apparent that the kneading members 95a, 95b are "mirror images" of one another so that the blades 109 of both are simultaneously upright or collapsed, notwithstanding that such kneading members 95a, 95b are being driven in opposite directions.)

The arm 14 has an edge surface 149 angled downward toward the pan base 67 and outward away from the portions 143, 145. When the member 95 is rotated in a direction which collapses the blade 109 as shown in dashed outline in FIG. 12, such surface 149 is of some help in urging dough ingredients, i.e., flour or the like, up away from the pan bottom 67. Better ingredient mixing results. Further, the kneading members 95a, 95b are spaced along the length of the pan 27 so that dough in the pan 27 will be reached by one or both of such members 95a, 95b.

In use, the pan 27 is placed (by "wide-side" insertion) into the oven chamber 19 and placement is so that the bottom support rim 69 of the pan 27 is between a pair of retention barriers 151 projecting upward from the floor 11. The barriers 151 and the support rim 69 are generally conformably shaped to one another so that the pan 27 is prevented by the barriers 151 from moving a significant distance in any direction.

A holding latch 153 is mounted on the floor 11 and has a tongue that projects into a slot in the pan rim 69. The latch 153 is spring-biased toward the rim 69 for pan holding during mixing and baking and is released by finger pressure at the conclusion of baking. The kneading members 95a, 95b are mounted on their respective shafts 93a, 93b and the ingredients then added to the pan 27.

Considering FIG. 3 particularly, the operating cycle is initiated and the motor 17 is operated in what is arbitrarily identified as the first or forward direction. So operated, the kneading members 95a and 95b counter-revolve, i.e., they are driven clockwise and counterclockwise, respectively, for several minutes to mix ingredients. During that time, the blades 109 are upright.

Next, the motor 17 is operated in the second or reverse direction for a time during which the kneading members 95a, 95b also counter-revolve and the blades 109 are collapsed. It has been found that brief reversal tends to pick up unmixed flour from the region 155 of the pan 27 that would not otherwise be properly mixed. Thereafter, the motor 17 is again operated in the forward direction and, finally, is operated in the reverse direction for a few seconds to collapse the blades 109 prior to baking.

There are advantages to using kneading members 95a, 95b which counter-revolve irrespective of the direction of motor rotation. One is that while the motor 17 is rotating in the forward direction and the blades 109 are upright, the dough ball tends to stay centered in the pan 27 between the members 95a, 95b. Another is that when the motor 17 is rotated in the reverse direction and the blades 109 are collapsed, loose flour in the region 155 is better incorporated into the dough ball.

After baking is complete, the door 23 is opened horizontally and the pan 27 removed in the same manner in which it was placed in the chamber 19, i.e., by "wide side" removal. As shown in FIG. 8, the resulting loaf 111 is of normal bakery loaf configuration and has a risen topside 113 extending along its length.

While the principles of this invention have been described in connection with specific embodiments, it should be understood clearly that these descriptions are made only by way of example and are not intended to limit the scope of the invention.

What is claimed is:

1. In an automatic single-loaf breadmaker having a drive mechanism, an oven chamber, a bread pan in the chamber, a kneading member in the pan and linked to the drive mechanism for mixing bread dough, and an automatic controller for energizing the drive mechanism and regulating the temperature in the chamber, the improvement wherein the pan has a single-loaf interior free of partitions and a spaced plurality of kneading members therein, thereby facilitating automatic preparation of a single loaf of bread having a risen topside extending along its length.

2. The automatic breadmaker of claim 1 including two upwardly-extending kneading members.

3. The automatic breadmaker of claim 2 wherein the pan has a bottom which is longer than it is wide and the pair of kneading members are spaced along the length of the pan, whereby dough in the pan will be reached by one or both of the kneading members.

4. The automatic breadmaker of claim 1 wherein each kneading member has a top hub with a grip member thereon to facilitate upward removal of the kneading member.

5. The automatic breadmaker of claim 4 wherein:
   each hub has a lower end and a blade pivotably secured along the lower end, said blade pivotable between an upright kneading position and a collapsed non-kneading position along the pan bottom; and
   the pan bottom has recessed portions each receiving one of the kneading members, such recessed portions of sufficient depth to fully receive the collapsed blades.

6. The automatic breadmaker of claim 1 wherein:
   the drive mechanism includes a motor;
   each kneading member has a blade mounted for pivoting movement between an upright position and a collapsed position;
   the blades are in the upright position when the motor rotates in a first direction; and
   the blades are in the collapsed position when the motor rotates in a second direction.

7. In an automatic breadmaker of the type having a motor, an oven chamber, a bread pan with a drive shaft through it, drive linkage extending from the motor to terminate at the chamber in a drive member, a kneading member engaged to the drive shaft in the pan for mixing bread dough, and an automatic controller for energizing the motor and regulating the temperature in the chamber, the improvement comprising:
   the pan having a spaced pair of drive shafts through it;
   a pair of the drive members to which the drive shafts are linked; and
   a spaced pair of the kneading members in the pan each engaged to one of the drive shafts;
thereby facilitating automatic preparation of a loaf of bread having a risen topside extending along its length.

8. The automatic breadmaker of claim 7 wherein:
   the pan has a bottom which is longer than it is wide; and
   the pair of drive shafts are through the bottom and spaced along the length of the pan;
whereby dough in the pan will be reached by one or both of the kneading members.

9. The automatic breadmaker of claim 8 wherein the drive shafts are substantially parallel.

10. The automatic breadmaker of claim 9 wherein:
    each kneading member has a hub with a lower end and a blade pivotably secured along the lower end, said blade pivotable between an upright kneading position and a collapsed non-kneading position along the pan bottom; and the pan bottom has recessed portions each receiving one of the kneading members, such recessed portions of sufficient depth to fully receive the collapsed blades.

11. The automatic breadmaker of claim 10 wherein the hub has a grip member thereon to facilitate removal of the kneading member.

12. The automatic breadmaker of claim 7 wherein the motor is linked by the drive linkage to both the drive members.

13. In an automatic breadmaker of the type having a base, a motor secured with respect thereto, an oven chamber, a bread pan in the chamber and having a drive shaft therethrough, drive linkage extending from the motor to terminate at the chamber in a drive member to which the drive shaft is detachably linked, a kneading member engaged to the drive shaft in the pan for mixing bread dough, and an automatic controller for energizing the motor and for regulating the temperature in the chamber, the improvement comprising:

the pan having a spaced pair of the drive shafts extending therethrough;

a pair of the drive members to which the drive shafts are linked; and a spaced pair of the kneading members in the pan each engaged to one of the drive shafts;

thereby facilitating automatic preparation of a bread loaf having a risen topside extending along its length.

14. The automatic breadmaker of claim 13 wherein:

the pan has a bottom which is longer than it is wide; and the pair of drive shafts are through the bottom and spaced along the length of the pan;

whereby dough in the pan will be reached by one or both of the kneading members.

15. The automatic breadmaker of claim 14 wherein the drive shafts are substantially parallel.

16. The automatic breadmaker of claim 15 wherein:

each kneading member has a hub with a lower end and a blade pivotably secured along the lower end, said blade pivotable between an upright kneading position and a collapsed non-kneading position along the pan bottom; and the pan bottom has recessed portions each receiving one of the kneading members, such recessed portions of sufficient depth to fully receive the collapsed blades.

17. The automatic breadmaker of claim 15 wherein:

each kneading member has a hub; and the hub has a grip member thereon to facilitate removal of the kneading member.

18. The automatic breadmaker of claim 13 wherein the motor is linked by the drive linkage to both the drive members.

19. In a breadmaker pan of the type having substantially flat side panels extending along the length thereof, a bottom extending between the side panels, a drive shaft through the bottom for engagement by a dough kneading member driven by a motor coupled to an automatic controller for powering the drive shaft and regulating temperature, the improvement wherein the pan includes a spaced pair of drive shafts through the bottom for engagement by a pair of dough kneading members in the pan, thereby facilitating automatic preparation of a single loaf of bread having a risen topside extending along its length.

20. The breadmaker pan of claim 19 wherein:

the pan bottom is longer than it is wide; and the pair of drive shafts are spaced along the length of the pan;

whereby dough in the pan will be reached by one or both of the kneading members.

21. The automatic breadmaker of claim 20 wherein:

each kneading member has a hub with a lower end and a blade pivotably secured along the lower end, said blade pivotable between an upright kneading position and a collapsed non-kneading position along the pan bottom; and the pan bottom has recessed portions each receiving one of the kneading members, such recessed portions of sufficient depth to fully receive the collapsed blades.

22. In an automatic breadmaker having a drive mechanism, an oven chamber, a bread pan in the chamber, a kneading member in the pan and linked to the drive mechanism for mixing bread dough, and an automatic controller for energizing the drive mechanism and for regulating the temperature in the chamber, the improvement wherein:

the pan has a spaced plurality of kneading members therein;

each kneading member has a hub with a grip member thereon to facilitate removal of the kneading member;

each hub has a lower end and a blade pivotably secured along the lower end, said blade pivotable between an upright kneading position and a collapsed non-kneading position along the pan bottom; and the pan base has recessed portions each receiving one of the kneading members, such recessed portions being of sufficient depth to substantially fully receive the collapsed blades, whereby the breadmaker facilitates automatic preparation of a single loaf of bread having a risen topside extending along its length.

* * * * *